(12) United States Patent
Weissbecker et al.

(10) Patent No.: US 8,376,330 B2
(45) Date of Patent: Feb. 19, 2013

(54) APPARATUS FOR ELASTICALLY SUPPORTING AN ENGINE TRANSMISSION UNIT

(75) Inventors: Jürgen Weissbecker, Bad Soden-Salmünster (DE); Eyk Karus, Bad Soden-Salmünster (DE); Heiko Pichel, Steinau (DE)

(73) Assignee: Anvis Deutschland GmbH (DE)

( * ) Notice: Subject to any disclaimer, the term of this patent is extended or adjusted under 35 U.S.C. 154(b) by 63 days.

(21) Appl. No.: 12/919,871

(22) PCT Filed: Jan. 16, 2009

(86) PCT No.: PCT/EP2009/000264
§ 371 (c)(1),
(2), (4) Date: Nov. 23, 2010

(87) PCT Pub. No.: WO2009/109261
PCT Pub. Date: Sep. 11, 2009

(65) Prior Publication Data
US 2011/0056761 A1 Mar. 10, 2011

(30) Foreign Application Priority Data
Mar. 4, 2008 (DE) .................... 20 2008 003 072 U

(51) Int. Cl.
*F16M 1/00* (2006.01)
(52) U.S. Cl. .............. 267/140.5; 267/140.13; 267/141.4
(58) Field of Classification Search ............... 267/141.4, 267/140.13, 140.4, 140.5, 141.1, 140.2, 292, 267/293, 294; 248/560, 610, 612; 180/291, 180/292, 299
See application file for complete search history.

(56) References Cited

U.S. PATENT DOCUMENTS 3,565,373 A * 2/1971 Frye ........................... 267/140.3
4,151,822 A 5/1979 Miura et al.
(Continued)

FOREIGN PATENT DOCUMENTS

DE 1206214 12/1965
DE 60100488 4/2004
(Continued)

OTHER PUBLICATIONS

Anvis Deutschland GmbH, International Search Report for International Application No. PCT/EP2009/000264, May 20, 2009, 2 pages.

*Primary Examiner* — Robert A Siconolfi
*Assistant Examiner* — Mariano Sy
(74) *Attorney, Agent, or Firm* — Matthew W. Witsil; Moore & Van Allen PLLC

(57) ABSTRACT

Apparatus for elastically supporting an engine transmission unit to a motor vehicle body, the apparatus comprising a rigid support member attachable to the engine transmission unit, a rigid flange attachable to the motor vehicle body and defining a horizontal, longitudinal direction particularly to be aligned with the driving direction of the vehicle, and an elastomeric body via which the support member is elastically supported by the flange and which has a vertical spring member for receiving a weight force of the engine transmission unit acting essentially vertically as well as perpendicularly to the longitudinal direction and a horizontal transverse direction, wherein the support member is extending away from the flange in transverse direction and has a mounting area offset with respect to the flange in transverse direction as well as a coupling section projecting in such a way essentially vertically through an opening formed through the flange that the coupling section forms an abutment for restricting a relative movement between the support member and the flange in both vertical directions.

12 Claims, 4 Drawing Sheets

U.S. PATENT DOCUMENTS

| | | | | |
|---|---|---|---|---|
| 4,215,842 | A * | 8/1980 | Brenner et al. | 267/140.13 |
| 4,930,758 | A * | 6/1990 | Poirier | 267/292 |
| 5,263,815 | A * | 11/1993 | Brenner | 267/219 |
| 5,460,238 | A * | 10/1995 | Burke et al. | 180/299 |
| 6,120,011 | A * | 9/2000 | Maeno et al. | 267/140.11 |
| 6,270,051 | B1 * | 8/2001 | Power | 248/638 |
| 6,450,474 | B1 * | 9/2002 | Bucksbee | 248/638 |
| 6,511,059 | B2 * | 1/2003 | Seynaeve | 267/140.13 |
| 6,802,498 | B2 * | 10/2004 | Makino et al. | 267/140.13 |
| 7,213,801 | B2 * | 5/2007 | Mayama | 267/140.13 |
| 7,549,620 | B2 * | 6/2009 | Kang | 267/141 |
| 2002/0014727 | A1 | 2/2002 | Takashima et al. | |
| 2006/0071380 | A1 * | 4/2006 | Yamamoto et al. | 267/140.11 |
| 2006/0108725 | A1 | 5/2006 | Ogawa et al. | |
| 2007/0182076 | A1 | 8/2007 | Wirges et al. | |

FOREIGN PATENT DOCUMENTS

| | | |
|---|---|---|
| EP | 0520881 | 12/1992 |
| JP | 2001003987 | 1/2001 |
| WO | 2006054336 | 5/2006 |

* cited by examiner

APPARATUS FOR ELASTICALLY SUPPORTING AN ENGINE TRANSMISSION UNIT

CROSS-REFERENCE TO RELATED APPLICATIONS

This application is a national stage application under 35 U.S.C. §371 of PCT Patent Application Serial No. PCT/EP2009/000264, filed on Jan. 16, 2009, and claims priority to German Patent Application No. 202008003072.2, filed on Mar. 4, 2008, the entire contents of both of which are hereby incorporated by reference.

BACKGROUND

It is known to attach the engine transmission unit to the vehicle body via elastic mountings or bearings. Such an elastic mounting has a support member rigidly attached to the engine transmission unit and a flange rigidly attachable to the vehicle body. Commonly the flange is shaped in form of a bridge extending mainly in longitudinal and vertical direction and thereby partially spanning across the support member in longitudinal direction. The flange is usually mounted in longitudinal direction of the motor vehicle and consequently essentially oriented in driving direction of the vehicle. In contrast, the support member extends in transverse direction away from the flange and defines a mounting area to which the engine transmission unit is to be attached, and which extends in transverse direction out of the bridge-shaped flange in order to provide accessibility in vertical direction when putting down the engine transmission unit onto the mounting area.

The elastomeric body of a known elastic mounting serves the purpose of elastically supporting the support member on the flange. As is known, the elastomeric body has a vertical support spring member essentially receiving a static load force of the engine-gear unit acting in a direction vertical to the longitudinal and transverse direction of the motor vehicle. The vertical spring member is usually formed like a sleeve in order to provide a uniform support in transversal and longitudinal direction.

In order to provide a vertical restriction of a relative movement between the support member and the flange, separately vulcanised abutments are provided at the support member and at the flange. For example, the elastomeric abutments interact with the inner surface of the bridge shaped flange. Furthermore, the known elastic mounting has an elastic abutment bead extending in longitudinal direction and located outside the bridge shaped flange, the abutment bead being attached to the support member and limiting an amplitude of movement of the flange in transverse direction.

The known elastic mounting is applied in particular in order to elastically attach an engine transmission unit mounted transversally to the driving direction to the motor vehicle body. The known elastic mounting is expensive to manufacture because for each of the different functions of the elastomeric body, i.e. abutment, support spring member, etc. separate elastomeric sections are to be vulcanised and corresponding tools have to be shaped. Furthermore, the known elastic mounting has a large dimension in vertical direction occupying a considerable portion of the engine compartment space which is usually very limited.

SUMMARY

It is the objective of the invention to overcome the disadvantages of the prior art, in particular to provide an apparatus for elastically supporting an engine transmission unit to a motor vehicle body that provides cost-effective manufacturing, simplification of the structure of the elastomeric body and a small vertical dimension.

This task is solved through the features of claim 1. Accordingly, an apparatus is provided for elastically supporting an engine transmission unit to a motor vehicle body, having a rigid support member attachable to the engine transmission unit. Furthermore, the elastic mounting comprises a rigid flange attachable to the motor vehicle body and defining a horizontal, longitudinal direction to be aligned in particular with the driving direction of the vehicle, and an elastomeric body via which the support member is elastically supported by the flange and which comprises a vertical spring member for receiving a weight force of the engine transmission unit acting essentially vertically as well as perpendicularly to the longitudinal direction and a horizontal transverse direction. The support member is extending away from the flange at least in transverse direction and has a mounting area offset with respect to the flange in transverse direction as well as a coupling section projecting in such a way essentially vertically through an opening formed through the flange that the coupling section forms an abutment for restricting a relative movement between the support member and the flange in both vertical directions. Preferably the flange is fitted with elastomer material for forming a dampening abutment, wherein the support member may be free of elastomer material vulcanised onto it. It is to be noted that by means of the structure according to the invention, the coupling portion projecting through the flange opening does provide a function of abutment not only for relative movement in the vertical directions, but also in a simple manner in all horizontal directions. Thereby, a restriction of the amplitude of movement in all three spatial directions is assured by the support member and the flange according to the invention.

With the engine transmission mounting according to the invention, a cost optimised, gear side solid matter mounting can be created that provides a three-point support of an engine constructed transversally. The engine transmission mounting according to the invention is cost efficient insofar as all elastomeric parts are realised on a one-piece support spring body while also providing the elastomeric abutments. The inclusion of the abutment function into the vertical support spring body can be achieved without affecting the rigidity of the support spring member.

In a further development of the invention, the coupling section enframes a rim limiting the opening of the flange, in particular two rim sections limiting the opening of the flange and opposing each other in longitudinal direction or preferably in transverse direction at least partially at a distance. The distance defines the freedom of movement between support member and flange and defines the amplitude of the relative movement.

Preferably, the abutment is formed by a lower profile element facing the motor vehicle body and an upper profile element facing away from the motor vehicle body and attached to the lower profile element. Therein the upper and lower profile element can essentially form an I-profile. The end legs of the I-profile, running essentially horizontally, can define abutment surfaces. It is to be noted that the middle column of the eye profile can be shaped as a "H", wherein the end legs extend away from the vertical, parallel main column of the H-form.

Preferably, the upper and the lower profile parts are separate components, in particular sheet steel components, that are attached to each other, in particular bolted together.

In a preferred embodiment of the invention the upper and the lower profile element are free of elastomer material attached by vulcanisation. The support spring member and the abutment are supported at the support member side by an intermediate element attached to the upper and lower profile element. The elastomer-free formation of the upper and lower profile element thereby achieved readily allows demounting and taking away the support member from the engine transmission mounting according to the invention. Preferably, the elastomeric body is supported at the support member side by the intermediate element arranged between the upper and lower profile element and attached thereto. The intermediate element can be a support element designed as a support plate. The elastomeric body is supported at the support member side in particular exclusively by the support element.

Preferably the support element has two support sections inclined with respect to the horizontal. The horizontal is defined by the plane to which the vertical is perpendicular. The support sections support respectively one spring arm of the elastomeric body. The spring arms extend away from the support element and partially form a returned V.

Advantageously the support sections of the support element extend, essentially in longitudinal direction, away from an attachment center that can be designed as a plate.

In a further development of the invention, the flange has one support surface for each of the spring arms, wherein the respective support surface is inclined according to the inclination of a corresponding support section of the intermediate element.

In a further development of the invention the flange has a ring body limiting the opening and having two mounting bases for attachment at the motor vehicle body and two longitudinal struts connecting the mounting bases and extending longitudinally between and alongside the upper and lower profile parts. As a combined functionality the struts form the abutment for an upper and lower vertical movement.

In order to provide a soft abutment, the longitudinal struts are at least partially, preferably completely, surrounded by elastomer material.

In a further development of the invention, the elastomeric body has two spring arms, inclined towards each other and extending away from each other in a longitudinal direction.

BRIEF DESCRIPTION OF THE DRAWINGS

Further characteristics, features and advantages of the invention will become clear through the following description of a preferred embodiment of the invention in conjunction with the accompanying drawings, showing.

DETAILED DESCRIPTION

Figure 1:
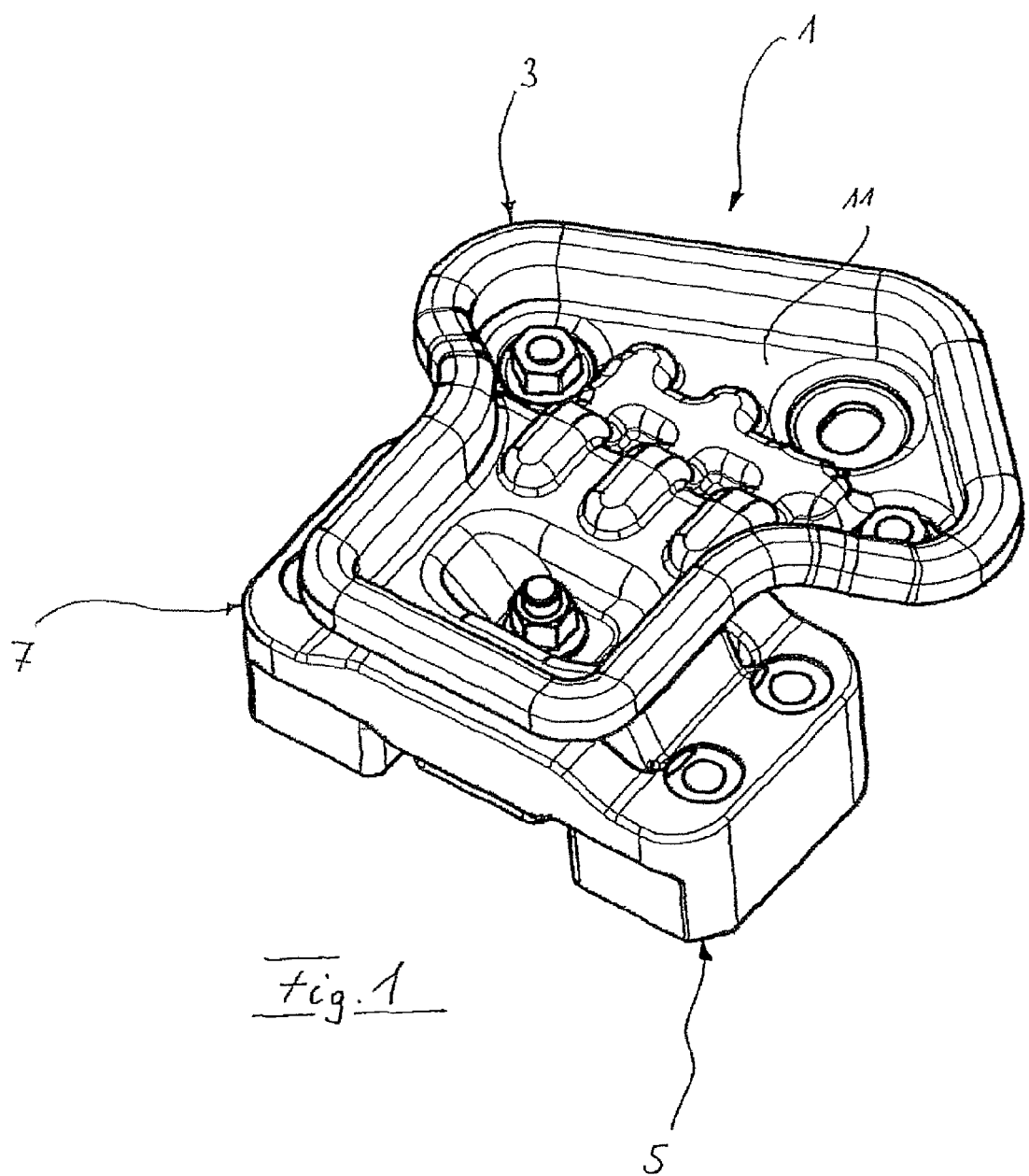
FIG. 1 a perspective view of an elastic mounting for an engine transmission unit.

In the FIGS. 1 to 4 the elastic mounting for supporting an engine transmission unit at a motor vehicle body according to the invention is generally given the reference numeral 1. The engine transmission unit and the motor vehicle body are not represented in the figures.

The elastic engine transmission mounting 1 essentially consists of three main components, i.e. a support member 3 at which the engine-gear, preferably mounted transversely with respect to the driving direction, is attachable, a flange 5 to be attached at the vehicle body and an elastomeric body 7 elastically coupling the support member with the flange 5.

Figure 2:
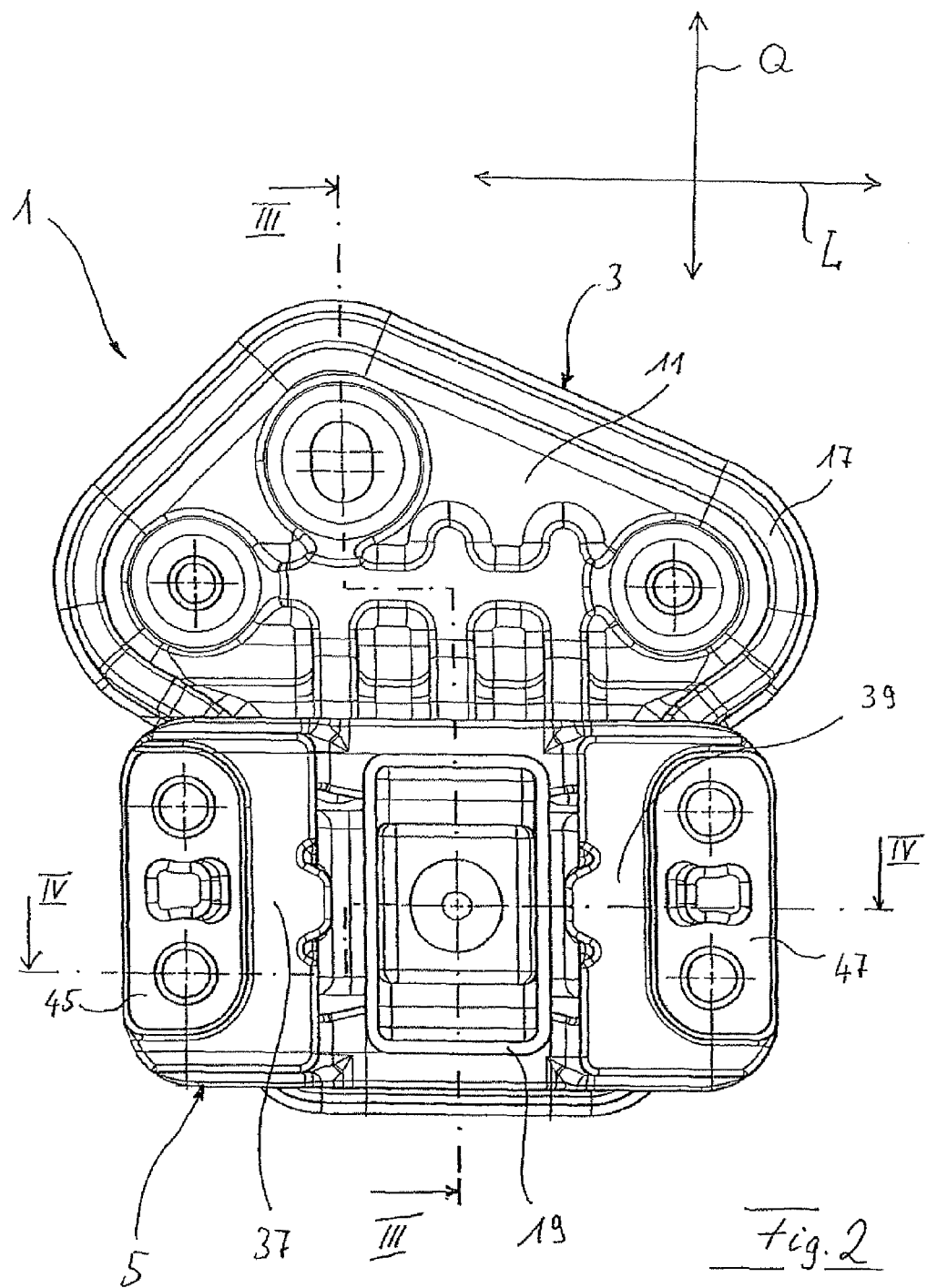
FIG. 2 a bottom view of the elastic mounting according to FIG. 1.

As evident from FIGS. 1 and 2, the support member 3 has a stepwise arrow shape pointing in a transverse direction Q. The support member 3 has an essentially horizontal mounting section 11 at which the engine transmission unit can be attached, and an essentially horizontal coupling section 13 upwardly offset in vertical direction with respect to the mounting section 11, at which the flange 5 is coupled to the support member 3 via the elastomeric body 7. The mounting section 11 extends from the coupling section 13 in transverse direction Q away from the engine-gear mounting 1, so that the mounting section 11 is freely accessible in vertical direction from above for the attachment of the engine-gear unit.

The support member 3 is formed by a first upper profile element 15 facing away from the vehicle body and forming the coupling section 13 and the mounting section 11, wherein the rim of the profile element is reinforced by a beading 17, and by another profile element 19 facing the vehicle body. The upper profile element 15 as well as the lower profile element 19 are attached to each other by means of a nut-bolt arrangement 21. The coupling section 13 of the upper profile element 15 and the lower profile element 19 are forming in their cross-section Q essentially an I-profile with horizontal end legs 23a-d.

Both profile parts 15, 19 have horizontal middle plates 25, 27, adjacent to each other, in-between which an intermediate plate 29 is clamped. The intermediate plate 29 has two supporting arms 33, 35 extending from a clamped center 31 in longitudinal direction L and being inclined by an angle of about 30° with respect to a horizontal defined by the transverse direction Q and longitudinal direction L. Two spring arms 37, 39 extending away from each other at the support member side are supported by the supporting arms 33, 35. At the flange side the spring arms 37, 39 are directly supported by a support surface 41, 43 of the flange 5, inclined corresponding to the inclination of the supporting arms 33, 35.

The upper profile element 15 is completely free of elastomer material of the elastomeric body 7 vulcanised onto it. On the support member side the spring forces are exclusively transmitted via the intermediate plate 29 and the nut-bolt connection 21 into the support member 3. Thereby the support member 3 including the upper and lower profile element 15, 19 is free of elastomer material and readily demountable and exchangeable from the mounting 1.

The flange 5 has an annular rectangular structure with two mounting bases 45, 47 facing each other in longitudinal direction L into which bores are formed for respective attachment screws (not represented). At the mounting bases 45, 47 the spring arms 37, 39 engage essentially perpendicularly to the support surfaces 41, 43.

In order to form the annular structure of the flange 5, the two mounting bases 45, 47 are connected with each other through longitudinal struts 49, 51. The mounting bases 45, 47 and the longitudinal struts 49, 51 are made of one piece.

Figure 3:
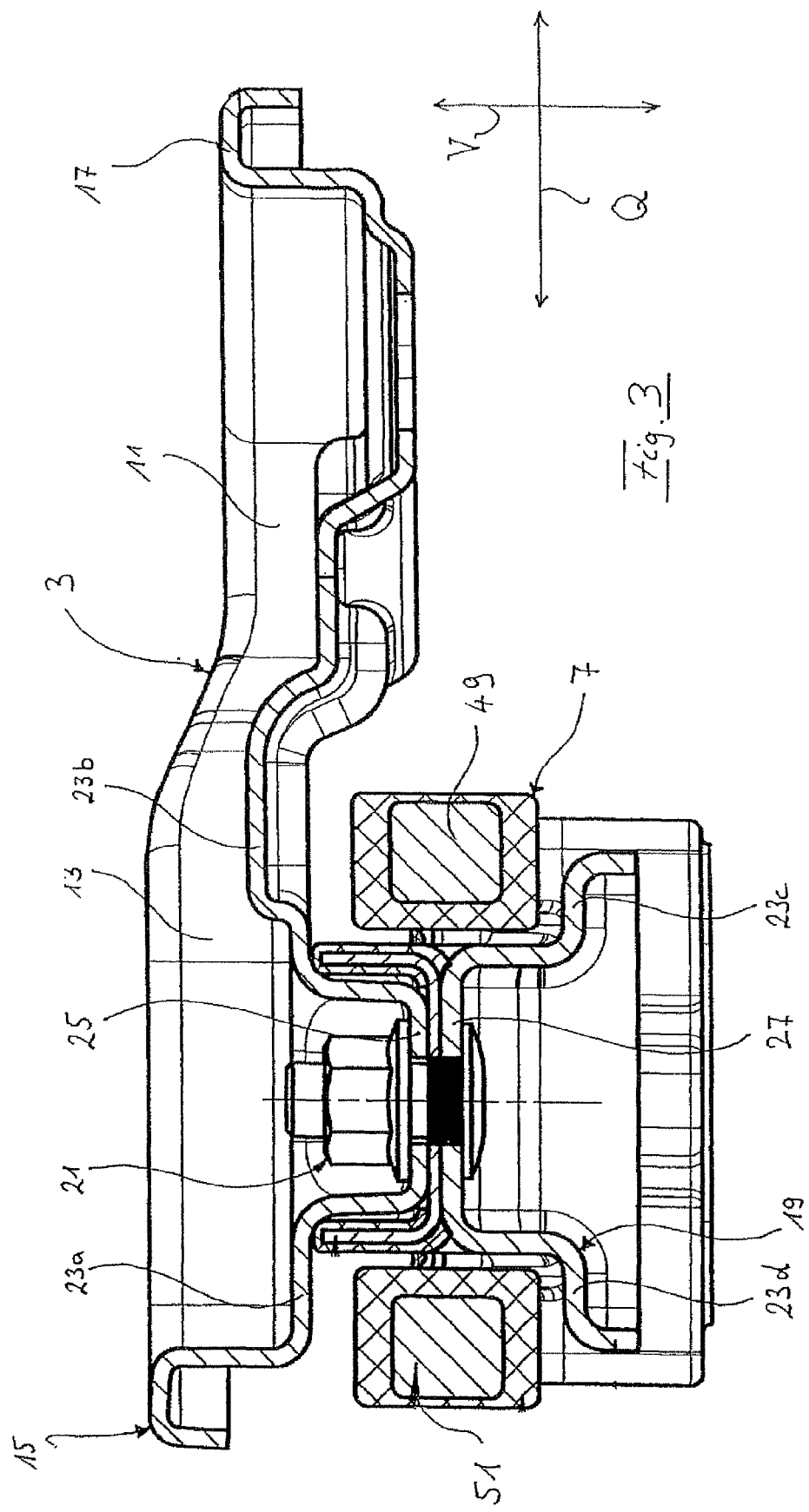
FIG. 3 a sectional view along the cut line III-III according to FIG. 2.
Figure 4:
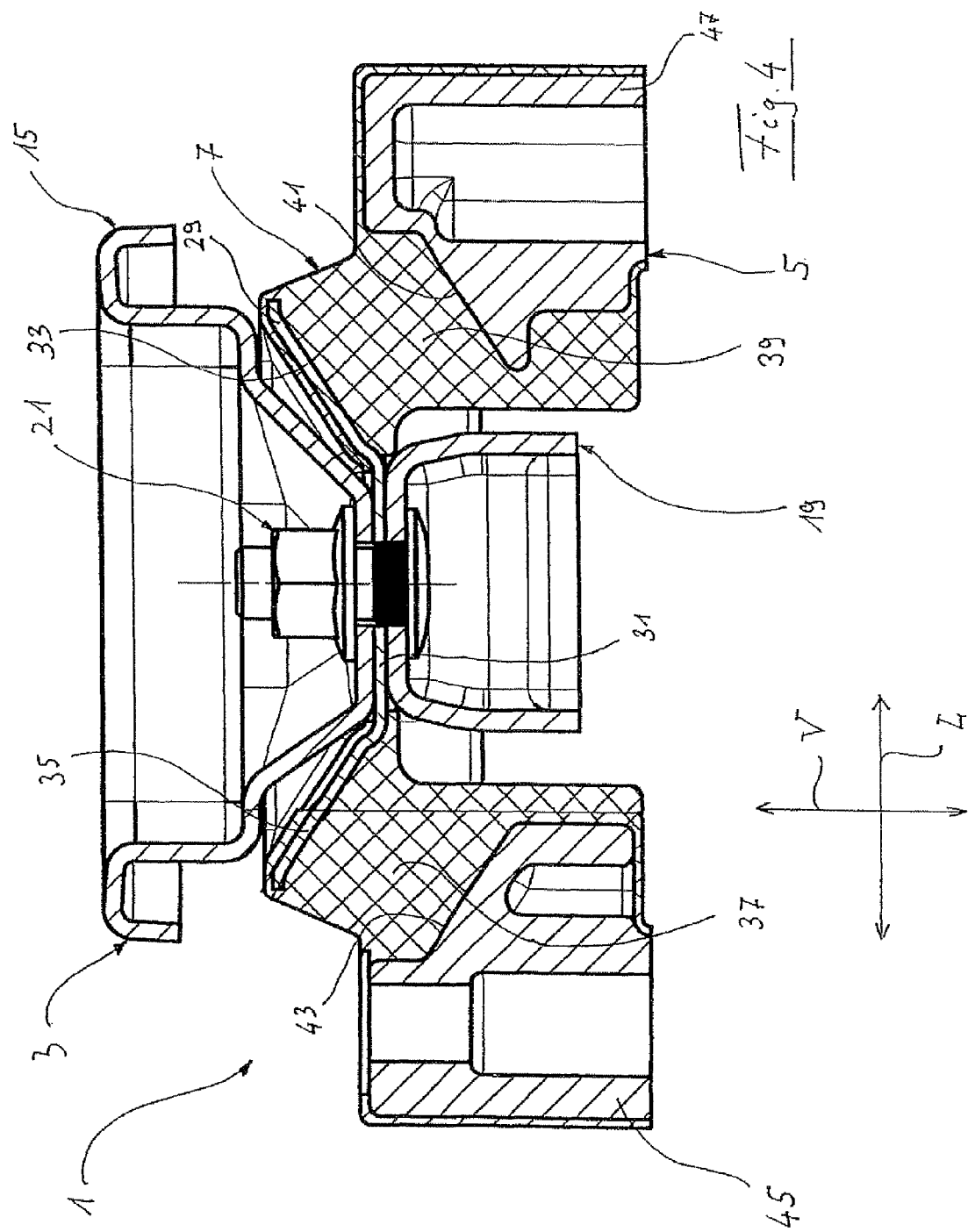
FIG. 4 a sectional view along the cut line IV-IV according to FIG. 2.

As evident from FIG. 3, the longitudinal struts 49, 51 are completely embedded in an elastomer material, wherein the upper and lower surfaces are provided with a thick elastomer layer in order to create an abutment function with respect to the end legs 23a-d.

As also evident from FIG. 3, the upper profile element 15 and the lower profile element 19 of the support member 3 at least partially embrace the longitudinal struts 49, 51 in transverse direction Q, so that a limitation of the relative movement is provided by means of abutment of the horizontal I-profile legs 23a-d at the respective longitudinal strut 49, 51 in both vertical directions V.

The features disclosed in the above description, the figures and the claims may be relevant individually as well as in any combination for the realisation of the invention in the different embodiments.

LIST OF REFERENCE NUMERALS 1 elastic engine transmission mounting
3 support member
5 flange
7 elastomeric body
11 mounting section
13 coupling section
15 upper profile element
17 beading
19 lower profile element
21 nut-bolt arrangement
23a-d horizontal end legs
25, 27 middle plates
29 intermediate plate
33, 35 supporting arms
37, 39 spring arms
41, 43 supporting surface
45, 47 mounting bases
49, 51 longitudinal struts
L longitudinal direction
Q transverse direction
V vertical direction
31 clamped center

What is claimed is:

1. Apparatus for elastically supporting an engine transmission unit to a motor vehicle body, the apparatus comprising:
a rigid support member attachable to the engine transmission unit;
a rigid flange attachable to the motor vehicle body and defining a horizontal, longitudinal direction configured to be aligned with a driving direction of the vehicle; and
an elastomeric body via which the support member is elastically supported by the flange and which comprises at least one spring arm for receiving a weight force of the engine transmission unit acting essentially vertically as well as perpendicularly to the longitudinal direction and a horizontal transverse direction,
wherein the support member is extending away from the flange in the transverse direction and has a mounting area offset with respect to the flange in the transverse direction as well as a coupling section projecting essentially vertically through an opening formed through the flange that the coupling section forms an abutment for restricting relative vertical movement between the support member and the flange, wherein the abutment is formed by a lower profile element adapted to face the motor vehicle body and an upper profile element adapted to face away from the motor vehicle body and attached to the lower profile element,
wherein in-between the upper and the lower profile elements a support element comprising a support plate is attached to the support member, wherein the elastomeric body includes a support member side proximate to the support member and is supported exclusively by the support element at the support member side, and
wherein the support element comprises two support sections inclined with respect to the horizontal, which respectively support the at least one spring arm of the elastomeric body at the support member side.

2. Apparatus according to claim 1, wherein the coupling section enframes a rim limiting the opening of the flange, the rim comprising two rim sections limiting the opening of the flange and opposing each other in the longitudinal direction, the transverse direction, or a combination thereof at least partially at a distance which defines an amplitude of the relative movement between the support member and the flange.

3. Apparatus according to claim 1, wherein the upper and the lower profile elements essentially form an I-profile comprising end legs, wherein the end legs of the I-profile, running essentially horizontally, define abutment surfaces.

4. Apparatus according to claim 1, wherein the upper and the lower profile elements are separate components that are attached to each other.

5. Apparatus according to claim 4, wherein the separate components comprise sheet steel components that are bolted together.

6. Apparatus according to claim 1, wherein the upper and the lower profile elements are free of any elastomer material that is attached by vulcanization.

7. Apparatus according to claim 1, wherein the support sections extend away from an attachment center essentially in the longitudinal direction.

8. Apparatus according to claim 1, wherein the elastomeric body includes more than one spring arm, wherein the flange has one support surface for each of the spring arms, wherein the respective support surface is inclined corresponding to the inclination of the support section.

9. Apparatus for elastically supporting an engine transmission unit to a motor vehicle body, the apparatus comprising:
a rigid support member attachable to the engine transmission unit;
a rigid flange attachable to the motor vehicle body and defining a horizontal, longitudinal direction configured to be aligned with a driving direction of the vehicle; and
an elastomeric body via which the support member is elastically supported by the flange and which comprises at least one spring arm for receiving a weight force of the engine transmission unit acting essentially vertically as well as perpendicularly to the longitudinal direction and a horizontal transverse direction,
wherein the support member is extending away from the flange in the transverse direction and has a mounting area offset with respect to the flange in the transverse direction as well as a coupling section projecting essentially vertically through an opening formed through the flange that the coupling section forms an abutment for restricting relative vertical movement between the support member and the flange, and
wherein the flange comprises a ring body limiting the opening and having two mounting bases for attachment at the motor vehicle body, and two longitudinal struts connecting the mounting bases and extending longitudinally between and alongside the upper and lower profile elements.

10. Apparatus according to claim 9, wherein the longitudinal struts are at least partially surrounded by elastomer material.

11. Apparatus for elastically supporting an engine transmission unit to a motor vehicle body, the apparatus comprising:
a rigid support member attachable to the engine transmission unit;
a rigid flange attachable to the motor vehicle body and defining a horizontal, longitudinal direction configured to be aligned with a driving direction of the vehicle; and an elastomeric body via which the support member is elastically supported by the flange and which comprises two spring arms, inclined towards each other and extending away from each other in a longitudinal direction, for receiving a weight force of the engine transmission unit acting essentially vertically as well as perpendicularly to the longitudinal direction and a horizontal transverse direction, wherein the support member is extending away from the flange in the transverse direction and has a mounting area offset with respect to the flange in the transverse direction as well as a coupling section projecting essentially vertically through an opening formed through the flange that the coupling section forms an abutment for restricting relative vertical movement between the support member and the flange.

12. A motor vehicle comprising an engine transmission unit, a motor vehicle body with a longitudinal direction and a transverse direction, and an apparatus for mounting the engine transmission unit to the motor vehicle body, the apparatus comprising:

a rigid support member attachable to the engine transmission unit;

a rigid flange attached to the motor vehicle body and defining a horizontal, longitudinal direction aligned with a driving direction of the vehicle; and an elastomeric body via which the support member is elastically supported by the flange and which comprises at least one spring arm for receiving a weight force of the engine transmission unit acting essentially vertically as well as perpendicularly to the longitudinal direction and a horizontal transverse direction, wherein the support member is extending away from the flange in transverse direction and has a mounting area offset with respect to the flange in transverse direction as well as a coupling section projecting essentially vertically through an opening formed through the flange that the coupling section forms an abutment for restricting relative vertical movement between the support member and the flange, wherein the abutment is formed by a lower profile element facing the motor vehicle body and an upper profile element facing away from the motor vehicle body and attached to the lower profile element, wherein in-between the upper and the lower profile elements a support element comprising a support plate is attached to the support member, wherein the elastomeric body includes a support member side proximate to the support member and is supported exclusively by the support element at the support member side, and wherein the support element comprises two support sections inclined with respect to the horizontal, which respectively support the at least one spring arm of the elastomeric body at the support member side.

* * * * *